(12) United States Patent
Shoihet et al.

(10) Patent No.: US 9,942,866 B2
(45) Date of Patent: Apr. 10, 2018

(54) METHOD FOR DETERMINING AND RECOVERING FROM LOSS OF SYNCHRONIZATION, COMMUNICATION UNITS AND INTEGRATED CIRCUITS THEREFOR

(71) Applicant: Freescale Semiconductor, Inc., Austin, TX (US)

(72) Inventors: Igor Shoihet, Israel (IL); Ofer Lent, Israel (IL); Roy M Shor, Israel (IL)

(73) Assignee: NXP USA, Inc., Austin, TX (US)

( * ) Notice: Subject to any disclaimer, the term of this patent is extended or adjusted under 35 U.S.C. 154(b) by 138 days.

(21) Appl. No.: 14/851,078

(22) Filed: Sep. 11, 2015

(65) Prior Publication Data

US 2017/0078996 A1 Mar. 16, 2017

(51) Int. Cl.
*H04W 56/00* (2009.01)
*H04W 76/06* (2009.01)
*H04W 4/06* (2009.01)

(52) U.S. Cl.
CPC ......... *H04W 56/0015* (2013.01); *H04W 4/06* (2013.01); *H04W 56/003* (2013.01); *H04W 76/066* (2013.01)

(58) Field of Classification Search
CPC . H04W 56/0015; H04W 56/003; H04W 4/06; H04W 76/066
See application file for complete search history.

(56) References Cited

U.S. PATENT DOCUMENTS

| | | | |
|---|---|---|---|
| 7,441,152 B2 | 10/2008 | Kato | |
| 8,782,461 B2 | 7/2014 | Muthrasanallur et al. | |
| 2002/0075979 A1* | 6/2002 | Wheatley | H04L 7/042 375/368 |
| 2003/0206243 A1* | 11/2003 | Kizu | H04N 5/93 348/513 |
| 2012/0201184 A1* | 8/2012 | Ai | H04L 12/189 370/312 |
| 2012/0307751 A1* | 12/2012 | Dinan | H04L 5/0007 370/329 |
| 2013/0223381 A1* | 8/2013 | Dinan | H04W 72/0406 370/329 |

(Continued)

*Primary Examiner* — Andrew Lai
*Assistant Examiner* — Chuong M Nguyen (57) ABSTRACT

A method of recovery from a time-synchronization loss in a communication unit between a first processor supporting physical layer communications and a second processor supporting layer-2 communications is described. The method comprises: detecting, by the first processor, that a loss of sync has occurred between the first and second processors; in response to said detecting, stopping sending subsequent physical layer messages from the first processor to the second processor, for example to allow the second processor to consume any old pending messages; re-starting a messaging process by the first processor by sending at least one new message to the second processor with updated System Frame Number, SFN, and Sub-Frame, SF, counter value; and receiving at the first processor at least one subsequent response message from the second processor acknowledging receipt of at least one new message with an indication of the received and updated SFN and SF counter value of that message thereby confirming synchronization being restored.

19 Claims, 6 Drawing Sheets

(56) References Cited

U.S. PATENT DOCUMENTS

2014/0310566 A1\* 10/2014 Balakrishnan ........ H04L 1/0083
  714/748
2016/0183276 A1\* 6/2016 Marinier ............... H04W 72/02
  370/329
2017/0013565 A1\* 1/2017 Pelletier .............. H04W 52/146

\* cited by examiner

METHOD FOR DETERMINING AND RECOVERING FROM LOSS OF SYNCHRONIZATION, COMMUNICATION UNITS AND INTEGRATED CIRCUITS THEREFOR

FIELD OF THE INVENTION

The field of the invention is directed in general to recovering from a loss of synchronization. In one aspect, the field of the invention relates generally to recovering from a loss of synchronization between layer 1 and layer 2 processing within an electronic device such as a base station.

BACKGROUND OF THE INVENTION AND DESCRIPTION OF THE RELATED ART

Wireless communication devices, such as mobile devices and base stations, include transmitter and receiver circuits (i.e., transceivers) and processors to process a wide variety of information in a wide variety of formats. In order to handle such a wide variety of information in such complex communication devices, a conceptual 'communications' model has been developed. The communications model characterizes and standardizes the communication functions of a telecommunication or computing system without regard of their underlying internal structure and technology. It is known as the Open Systems Interconnection model (OSI Model) of the International Organization for Standardization (ISO), maintained by the identification ISO/IEC 7498-1, and describes interoperability of diverse communication systems with standard protocols. The model partitions a communication system into abstraction layers.

A layer serves the layer above it and is served by the layer below it. For example, a layer that provides error-free communications across a network provides the path needed by applications above it, while it calls the next lower layer to send and receive packets that comprise the contents of that path. The lowest layer, (Layer 1 (L1)) is known as the Physical Layer and defines the electrical and physical specifications of the data connection. It defines the protocol to establish and terminate a connection between two directly connected nodes over a communications medium and may define the protocol for data flow control.

The layer above, i.e. Layer 2 (L2), is known as the Data Link Layer, which provides node-to-node data transfer between two directly connected nodes, by detecting and possibly correcting errors that may occur in the physical layer. The data link layer is divided into two sublayers: Medium Access Control (MAC) layer, which is responsible for controlling how devices in a network gain access to data and permission to transmit it; and Logical Link Control (LLC) layer, which controls error checking and packet synchronization.

Thus, a complex wireless communication device such as a base station, for example a long term evolution LTE™ base station (sometimes referred to as an eNodeB) includes two major functional components supporting L1 and L2 functions. The L1 functions are connected to the radio interface and follow strict real time demands. The L2 functions are less time critical. However, L2 messages are a dependency for L1.

Figure 1:
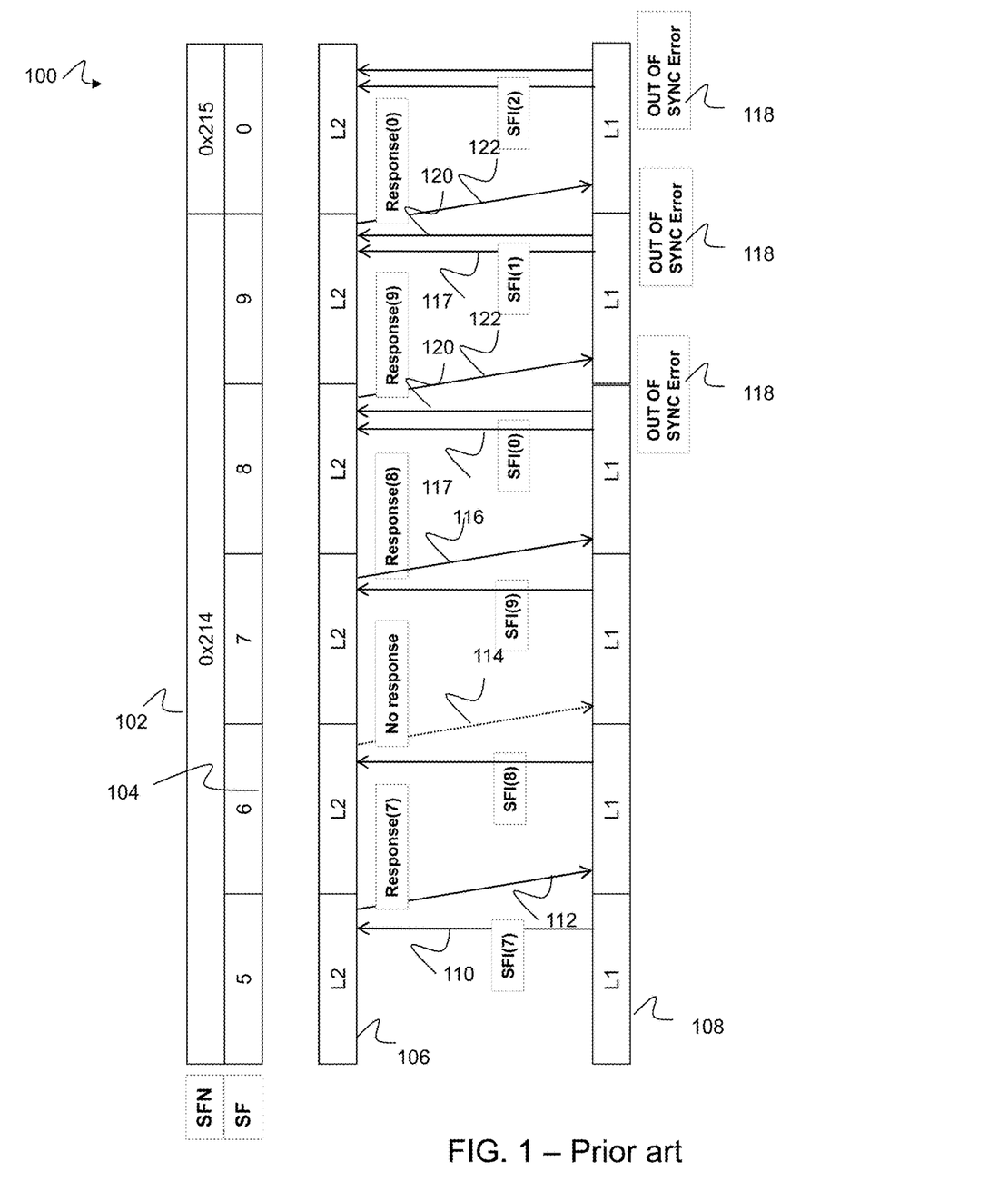
FIG. 1 is a simplified diagram of a known L1-L2 message sequence chart of a base station showing a loss of time-synchronization and its consequence.

FIG. 1 is a simplified diagram of a known L1-L2 message sequence chart 100 of a base station showing a loss of time-synchronization and its consequence. The L1 and L2 functions must be time-synchronized in an LTE communication device, for example time-synchronized within an LTE sub-frame (1 msec resolution). As illustrated, L1 frames 108 are synchronized to L2 frames 106. Every LTE Sub-Frame L1 sends a message 110 and the L2 responds in a message 112. Each message contains a System Frame Number (SFN) 102 and Sub-Frame (SF) counter value 104 identifying the Sub-Frame (0-9) being routed between the L1 and L2. A L1 processor compares the SFN and SF counter value of L2 response messages 112 with expected values.

As illustrated, when the L1 message is received at L2, no response is sent at 114 due to an internal L2 delay. The next SF counter value is sent in one or more skipped Sub-Frame(s) at 116, depending on the L2 delay. As there is no match, the L1 processor concludes that L1-L2 time-synchronization is lost, resulting in an out-of-sync error 118 that is generated and sent to the L2 processor in 120, which happens when L2 processing is delayed. Subsequent messages 117 from L1 and responses 122 from L2 continue to be out of time-synchronization with each other. Currently, in response to a loss of time-synchronization, a full system restart is performed in order for the communication device to recover from synchronization loss. A full system restart terminates base station (e.g. LTE™ eNodeB) services for a number of minutes, which is deemed unacceptable to service providers.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Methods, integrated circuits and communication units are described for determining a time-synchronization loss and recovery from a time-synchronization loss in a communication unit between a first processor supporting physical layer communications and a second processor supporting layer-2 communications. In particular, a methodology based on a halting of sending L1 messages and responding to L1 messages is employed between an L1 processor and an L2 processor when a timing synchronization loss between both has been determined. In selected embodiments a mechanism to determine a time-synchronization loss is achieved by updating a System Frame Number, SFN, and Sub-Frame, SF, counter value and monitoring responses of messages containing SFNs and SF counter values. In selected embodiments, a methodology for recovery from a time-synchronization loss is also described that allows synchronization recovery whilst the processors are in a 'running' mode of operation.

In some examples, the proposed recovery methodology may be faster than known synchronization recovery techniques, as a system re-start is not required due to the combined halting of L1 messages and responses thereto between L1 and L2 processors. In some examples, existing calls may remain connected after such a loss of synchronization between a first processor supporting physical layer communications and a second processor supporting layer-2 communications, as the communication unit no longer needs to effect a full system re-start.

Various illustrative embodiments of the present invention will now be described in detail below with reference to the Figures.

Figure 2:
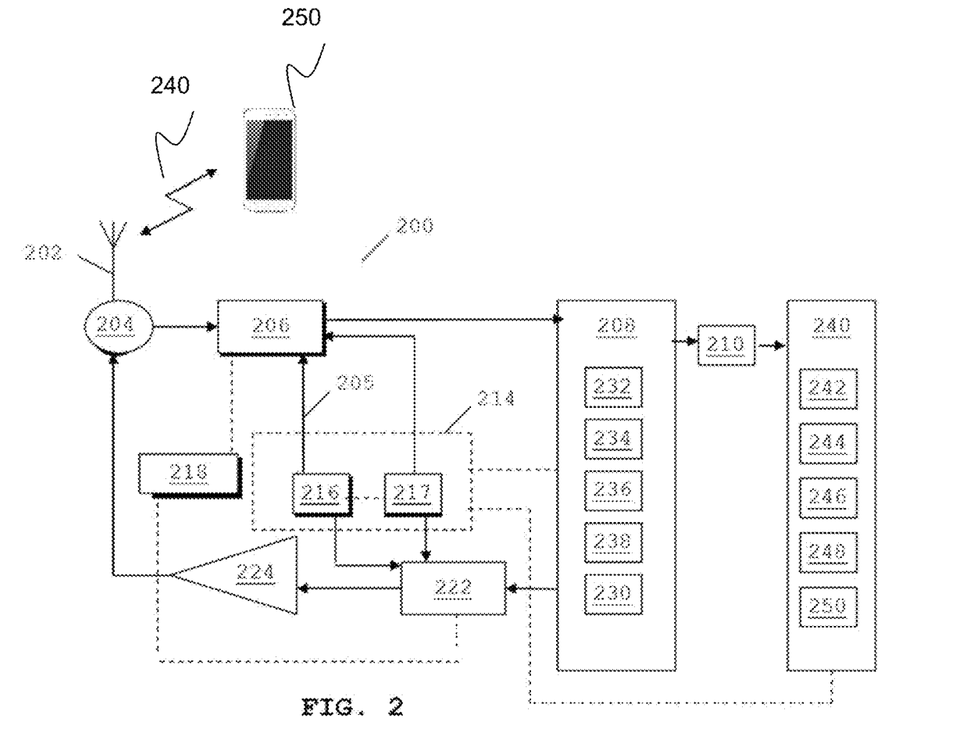
FIG. 2 is a simplified block diagram of a communication device, such as a base station, in accordance with selected embodiments of the present disclosure.

Referring to FIG. 2, a block diagram of a communication device, adapted in accordance with some examples, is shown. Purely for explanatory purposes, the communication device is described in terms of an LTE™ eNodeB 200. The eNodeB 200 contains one or several antennas 202 for communicating with, say, at least one remote communication device, such as user equipment (UE) 250, with one UE shown for simplicity reasons only. The one or more antennas 202 is/are coupled to one or more receiver chains and one or more transmitter chains via an antenna switch or duplexer 204. One or more receiver chains, as known in the art, include receiver front-end circuitry 206, effectively providing reception, frequency conversion, filtering and intermediate or base-band amplification, and finally analog to digital conversion. In some examples, such circuits or components may reside in a signal processing module 208, dependent upon the specific selected architecture. Otherwise, the receiver front-end circuitry 206 is coupled to a signal processing module 208 (generally realized by a digital signal processor (DSP)).

Signal processing module 208 comprises a processor core 230, coupled to L1 instruction cache 238, L1 data cache 236, L2 cache and memory 234 and a memory management unit 232 amongst many other functional software routines or logic.

Thereafter, the signal processing module 208 is coupled to a general purpose processor (GPP) 240 via a L1-L2 interface 210. GPP 240 comprises a processor core 250, coupled to L1 instruction cache 248, L1 data cache 246, L2 cache 244 and a programmable interrupt controller 242 configured to implement logic and programming structures and interrupt priority levels based on message interrupts, internal logic-driven interrupts and timers.

A skilled artisan will appreciate that the level of integration of circuits or components may be, in some instances, implementation-dependent.

A controller 214 maintains overall operational control of the eNodeB 200, and is coupled to the receiver front-end circuitry 206 and the signal processing module 208. In some examples controller 214 may comprise or be coupled to time-based digital functions (not shown) to control the timing of operations (e.g. transmission or reception of time-dependent signals, etc.) within the eNodeB 200. For example, the controller 214 also comprises a timer 217 and a memory 216 that selectively stores operating regimes, such as decoding/encoding functions, and the like.

As regards the one or more transmitter chains, this essentially comprises signal processing module 208 providing a transmit signal to transmit circuit 222, effectively providing, frequency conversion, filtering and base-band, intermediate or radio frequency amplification. An output from the transmit circuit 222 is provided to radio frequency (RF) power amplifier (PA) 224 coupled to the one or more antennas 202. The RF PA 224 and frequency generation circuit 218 are both operationally responsive to the controller 214.

A single processor may be used to implement a processing of receive signals, as shown in FIG. 2. Clearly, the various components within the eNodeB 200 can be realized in discrete or integrated component form, with an ultimate structure therefore being an application-specific or design selection.

In accordance with example embodiments of the invention, processor core 230 at least has been configured to perform the timing and processing of signals in accordance with the example processing functions of FIG's 3 to 6.

FIG. 2 also illustrates a communication protocol stack 260 employed in accordance with some embodiments of the invention. The protocol stack, as known to those skilled in the art, comprises a portion of seven communication layers within the OSI (Open Systems Interconnection) reference model defined by the ISO (International Organisation for Standardisation). The protocol stack 260 comprises seven layers of communication and logic elements associated with communication at those layers that are defined to handle communication between, for example, the UE 250 and eNode B 200 and other system elements, such as a radio network controller, etc. The protocol stack 260 in the OSI model includes a physical layer (L1) 264 that contains the basic networking hardware transmission technologies of a communication system. It is the fundamental layer underlying the logical data structures of the higher level functions in the communication system. The physical layer defines the means of transmitting raw bits rather than logical data packets over a physical link connecting system nodes or devices. The bit stream may be grouped into code words or symbols and converted to a physical signal that is transmitted over a communication medium. The physical layer provides an electrical, mechanical, and procedural interface to the communication medium. Within the OSI model, the physical layer translates logical communications requests from the higher data link layer (L2) 262 into hardware-specific operations to affect transmission or reception of signals. The data link layer (L2) 262 is the protocol layer that provides the functional and procedural mechanisms to transfer data between network nodes or communication devices in a communication system, as well as detect and possibly correct errors that may occur in the physical layer (L1) 264.

In examples, one of the processing cores takes care of maintaining communication with external entities by compensating for the other processing cores' malfunction. Thus, the DSP 208 maintains physical layer (L1) communications to remote wireless communication units, such as UE 250 over the air interface 240, even after timing synchronization is lost between DSP 208 and GPP 240. In this manner, the example eNodeB facilitates a time-synchronization recovery without requiring a system restart. In some examples, the proposed recovery procedure may take only few milliseconds, thereby enabling existing calls to remain connected.

Figure 3:
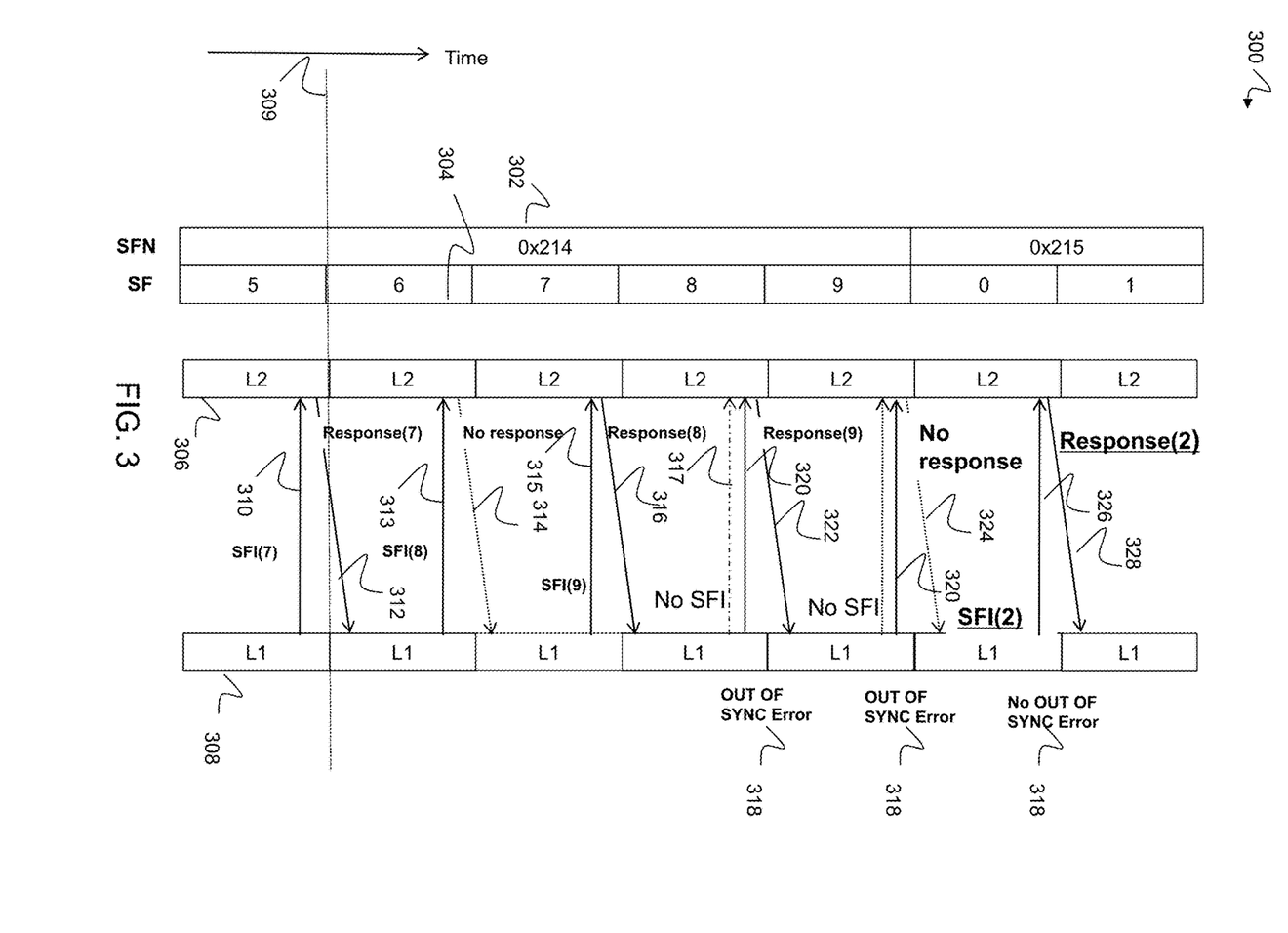
FIG. 3 is a simplified diagram of a L1-L2 message sequence chart of a base station showing a loss of time-synchronization in accordance with selected embodiments of the present disclosure.

FIG. 3 is a simplified diagram of a L1-L2 message sequence chart 300 of a wireless communication unit, such as a base station, showing a loss of time-synchronization in accordance with selected embodiments of the present disclosure. The L1 and L2 functions must be time-synchronized in the vast majority of wireless communication units, and in particular in an LTE communication device, for example the L1 and L2 functions are shown as time-synchronized across time line 309, within an LTE sub-frame (1 msec resolution). As illustrated, in accordance with selected embodiments of the present disclosure, L1 frames 308 are synchronized to L2 frames 306. In contrast to the L1-L2 message sequence chart 100 of FIG. 1, the L1-L2 message sequence chart 300 of FIG. 3 shows a halting of sending L1 messages, e.g. identified as 'No SFI', and responding to L1 messages from the L2 processor, e.g. identified as 'No response' when a timing synchronization loss between both has been determined. Thereafter, time re-synchronization may be achieved following this determined loss of time-synchronization, as both L1 and L2 functions recognize that a loss of time-synchronization has occurred and that the other function has been made aware, whilst there is still communications there between. Advantageously, and notably, time re-synchronization may be rapidly achieved without a need for a full system restart.

Every LTE Sub-Frame L1 sends a message 310 (identified as SFI (7)) and the L2 responds in a message 312 (identified as Response (7)). Each message contains a System Frame Number (SFN) 302 and Sub-Frame (SF) counter value 304 identifying the Sub-Frame (0-9) being routed between the L1 and L2. A L1 processor compares the SFN and SF counter values of L2 response messages 312 with expected values, e.g. an expected value based on the message 310 that is being responded to.

However, as illustrated, L1 sends a subsequent message 313 (identified as SFI (8)), which is received at L2 but not processed in a timely manner, say, due to an internal delay within L2. Thus, no response from the L2 processor (identified as 'No Response') to the L1 processor is sent at 314 and the L2 processor misses on sending the response.

As illustrated, the L1 processor sends a further subsequent message 315 (identified as SF (9)). The L2 processor acknowledges receipt of the further subsequent message 315 and thus, a response is sent from the L2 processor (identified as 'Response SF(8)', as this is the next SF counter value to be sent) to the L1 processor at 316, albeit delayed. Hence, the next SF counter value (identified as Response (8)) is therefore sent in a skipped Sub-Frame. A determination is made by the L1 processor as to whether there is a match of the received SFN and SF counter value with the expected values. If there is no match of the received SFN and SF counter value with the expected values, the process identifies a synchronization loss. However, if there is a match of the received SFN and SF counter value with the expected values, the L1 processor confirms that synchronization is maintained. In this instance, as there is no 'match', when the L1 processor compares the SFN and SF value that was sent 315 to the one received 316 from the L2 processor, the L1 processor concludes that L1-L2 time-synchronization is lost. In this example, this results in the L1 processor sending an out-of-sync error 318 that is generated and sent to the L2 processor in 320.

Notably, in response to the loss of synchronization, the L1 processor temporarily stops sending messages to the L2 processor, as identified by dotted line 317, as synchronization has been lost. A subsequent response 322 from the L2 processor has increased the SF counter value further and sent a response message L2 processor (identified as 'Response SF(9)', as this is the next SF counter value to be sent) to the L1 processor at 322.

At this point, in known systems and in response to such a loss of time-synchronization, a full system restart is performed in order for the communication device to recover from synchronization loss. Such a full system restart would terminate base station (e.g. LTE™ eNodeB) services for a number of minutes, which is deemed unacceptable to service providers.

However, in contrast to this process, example embodiments maintain physical layer (L1) communications to remote wireless communication units over the air interface whilst recovering quickly from the loss of synchronization. Here, the L1 processor doesn't send new messages (except out-of-synchronization error messages 320) to the L2 processor. Following receipt of these L1 out-of-synchronization error messages 320, the L2 processor continues to send response messages to the L1 processor, notably continuing with sending SFN and SF counter value information. This allows the L2 processor enough flexibility to consume all pending L1 messages. Once L2's incoming SFI message queue is emptied, the L2 processor stops sending responses. In parallel, the L1 processor continues transmitting LTE signal (e.g. BCH) over the physical layer air interface, such as air interface 240 of FIG. 2, thereby allowing the remote wireless communication units, such as UE 250 from FIG. 2, to stay connected to the eNodeB, even though actual data packets are lost.

Thus, in some examples, the L2 processor continues to process these pending messages and sending responses to the L1 processor until the L2 processor has consumed all pending L1 messages. Each of these responses that are sent while the system is operating in an out-of-sync mode are sent with SFN and SF counter value information, thereby informing the L1 processor that the L2 processor is processing pending L1 messages.

Once the L2 processor has consumed all of the pending L1 messages, the L2 processor stops sending messages to the L1 processor at 324 (identified in FIG. 3 as 'no response').

In response to a 'no response' message at 324 from the L2 processor, the L1 processor then re-starts the messaging process (with updated SFN and SF counter values (identified as 'SFI(2)') at 326.

Here, the L1 processor has updated the SF counter value upon each iteration so that updated SFN and SF counter values are used. The L2 processor then responds in a timely manner with the expected, correct SFN and SF counter value (identified as 'Response(2)') at 328 and synchronization is restored.

The purpose of communication between a UE (handset) and the base-station is passing data packets. If data packets are dropped, they have to be re-sent. L1 is not aware of this dropping of data packets, as the tracking is done in higher layers. Thus, after synchronization is restored, the L2 processor is responsible for data integrity and, as such, takes care of re-sending any missed data.

Figure 4:
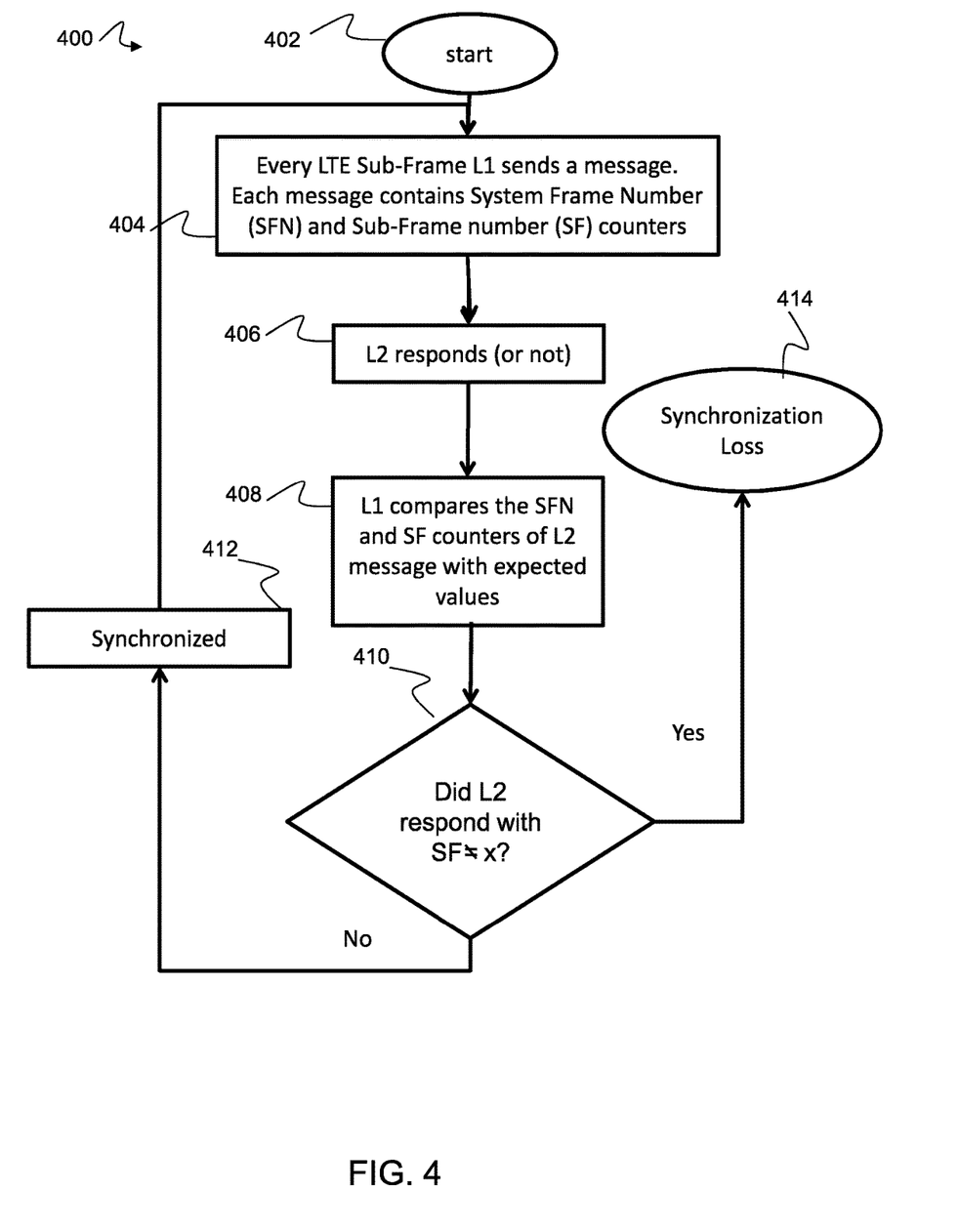
FIG. 4 illustrates an example flow diagram of a method for determining a time-synchronization loss in accordance with selected embodiments of the present disclosure.

FIG. 4 illustrates an example flow diagram 400 of a method for determining a time-synchronization loss in accordance with selected embodiments of the present disclosure. The example flow diagram starts at 402 with L1-L2 being synchronized and a process initiated to determine an operational change that has resulted in a synchronization loss. At 404, with every LTE sub-frame, the L1 processor sends a message to the L2 processor. Each message contains a System Frame Number (SFN) and Sub-Frame (SF) counter value. At 406, the L2 processor responds to the L1 processor acknowledging receipt of each of the messages, or not as the case may be (as no response may mean sync loss, but in some examples it may not yet have been determined, as L1 has no solution at this stage). At 408, the L1 processor compares the SF counter value of the L2 message with the expected SF value, assuming a linear progression of the counter.

At 410, a determination is then made as to whether there is a match of the received SFN and SF counter value with the expected values, identified as 'did L2 respond with SF !=x'. If there is no match of the received SFN and SF counter value with the expected values at 410, or for example if L2 does not respond, the process identifies a synchronization loss at 414, which in some examples leads to the L1 processor generating and sending one or more out-of-synchronization message(s). Only later when the L2 processor sends old messages (with old SFN_SF) will L1 react (by holding until L2 is re-aligned).

However, if there is a match of the received SFN and SF counter value with the expected values at 410, the process confirms that synchronization is maintained at 412 and the process loops back to 404.

Figure 5:
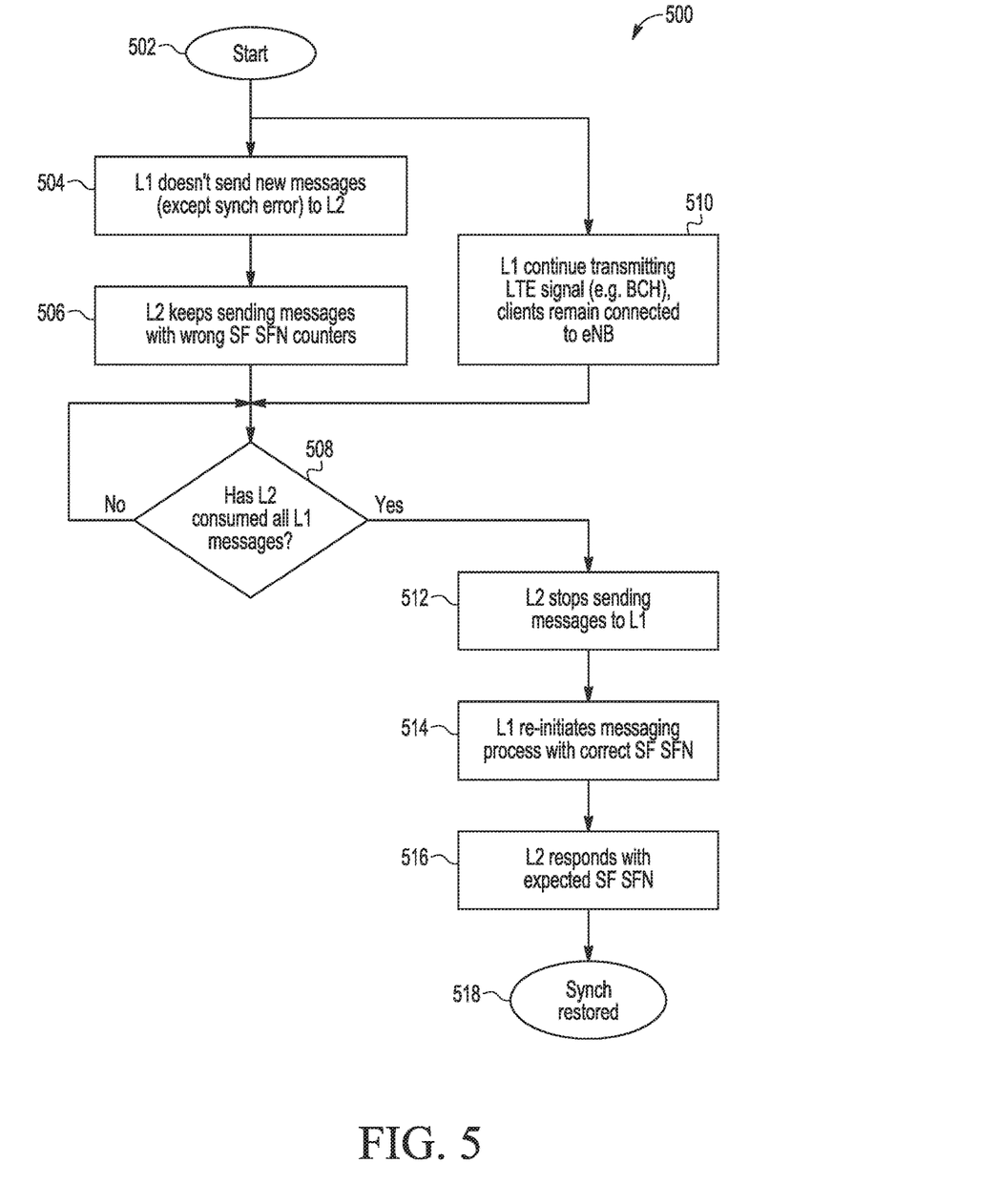
FIG. 5 illustrates an example flow diagram of a method of a recovery procedure following a determined time-synchronization loss in accordance with selected embodiments of the present disclosure.

FIG. 5 illustrates an example flow diagram 500 of a recovery procedure following a determined time-synchronization loss, in accordance with selected example embodiments of the present disclosure. The example flow diagram starts at 502 following a synchronization loss. First, in accordance with selected example embodiments and following a synchronization loss, the L1 processor doesn't send new messages (except an out-of-synchronization error message) to the L2 processor at 504. At 506, following receipt of the L1 out-of-synchronization error message, the L2 processor continues to consume (e.g. process) pending L1 messages. In some examples, the L2 processor continues to send response messages to the L1 processor, notably with incorrect SFN and SF counter values. This allows the L2 processor enough flexibility to consume all pending L1 messages. In parallel at 510, L1 continues transmitting LTE signal (e.g. BCH) thereby allowing the clients to stay connected to the eNodeB, even though actual data packets are lost.

At 508, following 506 and 510, a determination is made by the L2 processor as to whether the L2 processor has consumed all pending L1 messages. The process loops until the L2 processor has consumed all pending L1 messages. When the queue is empty, the L2 processor has nothing to respond to, and so it doesn't send any response. At 512, once the L2 processor has consumed all of the L1 messages, the L2 processor stops sending messages to the L1 processor as there are no responses left to send (e.g. identified as a 'no response'). At 514, in some examples in response to the L2 processor stopping sending messages, the L1 processor then re-initiates the messaging process (with updated and correct SFN and SF counter values). In some examples, the L1 processor may determine the updated and correct SFN and SF counter values by incrementing the SF counter value from a previous correctly received and acknowledge L1 message. At 516, the L2 processor then responds with the expected SFN and SF counter value and synchronization is restored at 518. Synchronization is then restored at 518.

Figure 6:
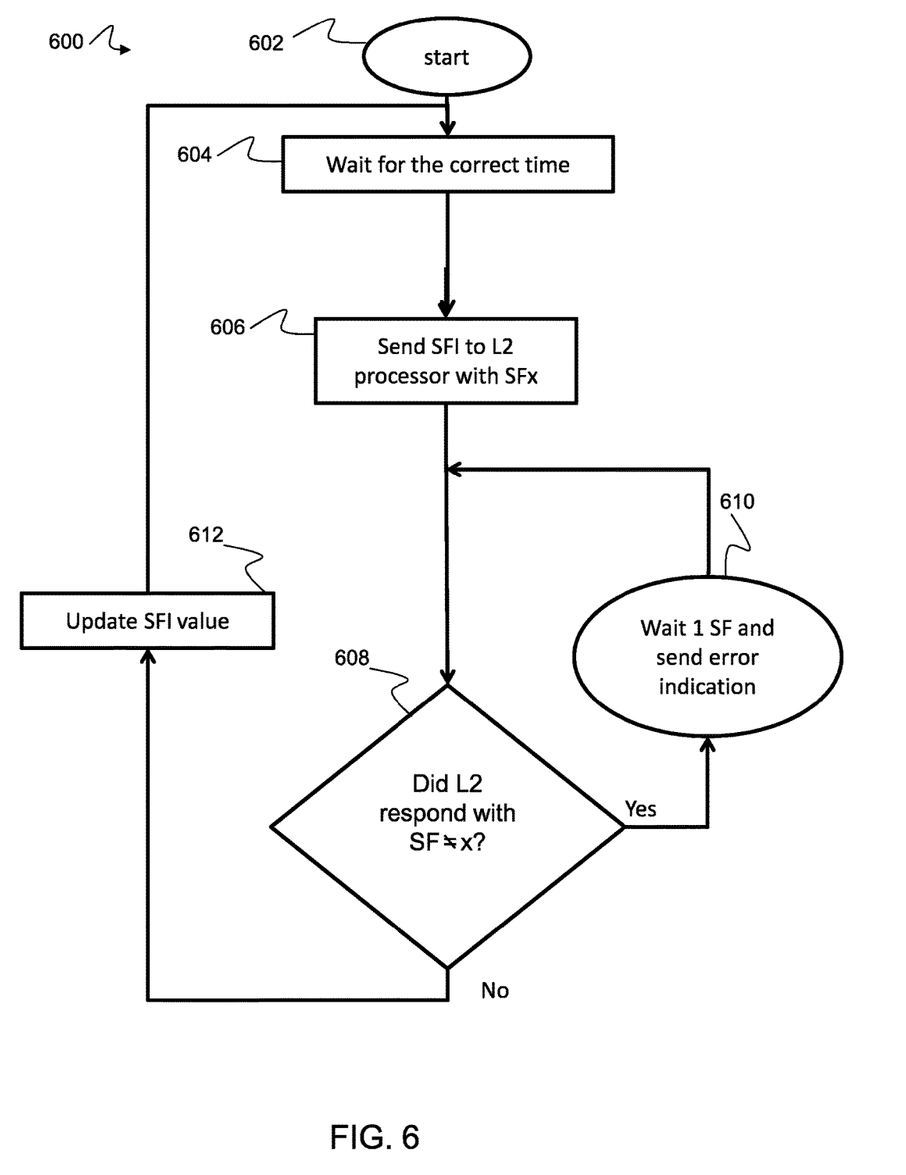
FIG. 6 illustrates an example flow diagram of a method of a recovery procedure from a physical layer (L1) processor perspective in accordance with selected embodiments of the present disclosure.

FIG. 6 illustrates an example flow diagram 600 of a method of a recovery procedure from a physical layer (L1) processor perspective in accordance with selected embodiments of the present disclosure. The example flow diagram starts at 602 and the L1 processor wait for the correct time (measured internally in L1) at 604. At 606, the L1 processor sends a message to the L2 processor where the message comprises a Sub-Frame Indicator (SFI) with a SFN. At 608, the L1 processor determines whether or not the L2 processor responded with the correct SFN and SF counter value, identified as 'did L2 respond with SF !=x'. If the L2 processor has responded with the correct SFN and SF counter value in 608, or if L2 did not respond at all, the L1 processor updates the SFI (e.g. the SF counter value, for example by incrementing the counter value) at 612, and the process loops to 604 where the L1 processor waits for the next frame.

However, if the L2 processor has responded with the incorrect SFN and SF counter value in 608, the L1 processor waits for one SF and sends an error indication, for example one or more out-of-synchronization message(s), to the L2 processor, as indicated at 610. At this point, the L2 processor may consume or process one or more pending L1 messages, and respond accordingly, and then stop sending a response to the L1 processor, or if there are no pending L1 messages may initiate a 'no response' state. When everything is fine, the left loop is taken (e.g. regular infinite behavior). When the system is out of sync, the right loop is taken (e.g. wait until sync is restored).

Applicants have determined that a need exists for improved determination and recovery from a timing synchronization loss between L1 and L2 layers in wireless communication units supporting communications (such as 3G, LTE, 4G and future generations of systems) to overcome the problems in the art, such as outlined above, though further limitations and disadvantages of conventional technologies will become apparent to one of skill in the art after reviewing the remainder of the present application.

By now it should be appreciated that there has been provided methods, integrated circuits and communication units for determining a time-synchronization loss and recovery from a time-synchronization loss in a communication unit between, say, a first processor supporting physical layer communications and a second processor supporting layer-2 communications.

As will be appreciated, the disclosed methods, integrated circuits and communication units described herein may be embodied in hardware as one or more processing stages, for example with storage devices for holding or buffering message content. However, selected aspects of the functionality of the one or more processing stages may be programmed or loaded by processing circuitry (e.g., a field-programmable gate array) executing software (e.g., in a processor or a controller including but not limited to firmware, resident software, microcode, etc.). Any such programming operation may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk, USB memory stick, and an optical disk, such as a compact disk-read only memory (CD-ROM), compact disk-read/write (CD-R/W), DVD, and the like.

In some examples, the determining a time-synchronization loss and recovery from a time-synchronization loss concepts herein described may be embodied in one or more integrated circuits. In some examples, an improved performance with lower die area and lower power consumption may be achieved with the one or more integrated circuits due to the flexible and multi-faceted approach to determining and recovering from time-synchronization loss.

Although examples of the invention have been described with reference to a wireless communication unit managing a time-synchronization loss and recovery from a time-synchronization loss between L1 and L2 layers, it is envisaged that the inventive concepts described herein may be employed to any other communication unit, and is not limited to a wireless communication unit or the particular L1 and L2 layers. In some wireless examples, the determining a time-synchronization loss and recovery from a time-synchronization loss concepts herein described may be agnostic to various radio access technologies (RATs) and thus may be embodied in one or more of the following: Long Term Evolved (LTE™) products, Wideband Code Division Multiple Access (WCDMA) products, Global System for Mobile communications (GSM) products, EDGE, etc. In some examples, the determining of a time-synchronization loss and recovery from a time-synchronization loss concepts herein described may be scalable across various wireless communication units, for example base-station types, e.g. pico-cell, femto-cell to macro-cell base-stations, and mobile stations or user equipment.

In the disclosed methodology for recovery from a time-synchronization loss in a communication unit between a first processor supporting physical layer communications and a second processor supporting layer-2 communications, a method comprises: detecting, by the first processor, that a loss of sync has occurred between the first and second processors; in response to said detecting, stopping sending subsequent physical layer messages from the first processor to the second processor; re-starting a messaging process by the first processor by sending at least one new message to the second processor with updated System Frame Number, SFN, and Sub-Frame, SF, counter value; and receiving at the first processor at least one subsequent response message from the second processor acknowledging receipt of at least one new message with an indication of the received and updated SFN and SF counter value of that message thereby confirming synchronization being restored.

In this manner, the disclosed methodology for recovery from a time-synchronization loss allows synchronization recovery whilst the processors are in a 'running' mode of operation. In some examples, the proposed recovery methodology may be faster than known synchronization recovery techniques. In some examples, existing calls may remain connected after loss of synchronization between a first processor supporting physical layer communications and a second processor supporting layer-2 communications.

In selected embodiments, detecting a loss of synchronization at the first processor may include comparing received SFN and SF counter values in response messages from the second processor with expected values and detecting a loss of synchronization when there is no match. In selected embodiments, comparing received SFN and SF counter values in response messages from the second processor with expected values may include assuming by the first processor a linear progression of the SF counter values between received response messages.

In selected embodiments, in response to a loss of synchronization, the second processor may consume any pending physical layer messages. In selected embodiments, the second processor may continue to send a number of response messages to the first processor after a loss of synchronization thereby indicating at least one pending message being consumed at the second processor. In selected embodiments, stopping sending response messages from the second processor to the first processor may be in response to the second processor having consumed all of the pending physical layer messages. In selected embodiments, consuming any pending physical layer messages by the second processor may include determining by the second processor whether it has consumed all of the pending physical layer messages and stopping sending response messages to the first processor in response thereto.

In selected embodiments, re-starting a messaging process by the first processor by sending at least one new message with updated SFN and SF counter values may include adding a number of skipped and missed SFs to the last SF counter value successfully received to generate the updated SFN and SF counter value In selected embodiments, the method may further comprise continuing to transmit physical layer signals from the first processor over an air interface after stopping sending subsequent physical layer messages to the second processor. In selected embodiments, continuing to transmit physical layer signals from the first processor over an air interface may include continuing to transmit physical layer long term evolution (LTE) signals from the first processor over the air interface after stopping sending subsequent physical layer messages to the second processor. In selected embodiments, continuing to transmit physical layer LTE signals from the first processor over the air interface may include continuing to transmit physical layer broadcast channel signals from the first processor over the air interface thereby allowing at least one other communication unit to stay connected to the communication unit.

In selected embodiments, stopping sending subsequent physical layer messages from the first processor to the second processor may be exclusive of the first processor sending an out-of-synchronization error message to the second processor. In selected embodiments, in response to receiving an out-of-synchronization error message from the first processor, the second processor may commence consuming any pending physical layer messages.

In addition, there is a disclosed methodology for determining a time-synchronization loss in a communication unit between a first processor supporting physical layer communications and a second processor supporting layer-2 communications. The method comprises: sending a plurality of messages from the first processor to the second processor, wherein each message contains a System Frame Number (SFN) and Sub-Frame (SF) counter value; receiving at the first processor a plurality of response messages from the second processor acknowledging receipt of each message at the second processor with an indication of the received SFN and SF counter value of that message; comparing at the first processor the SFN and SF counter values of the received plurality of response messages with expected SFN and SF counter values to determine whether there is a match; and detecting a loss of synchronization at the first processor if there is not a match.

In selected embodiments, each SF counter value may be a long-term evolution, LTE, sub-frame counter value. In selected embodiments, comparing at the first processor the SFN and SF counter values of the received response messages with expected values to determine whether there is a match may include the first processor assuming a linear progression of the SF counter value between received response messages.

In another form, an integrated circuit for recovery from a time-synchronization loss is described. The integrated circuit comprises a first processor. The first processor is configured to: detecting, by the first processor, that a loss of sync has occurred between the first processor supporting physical layer communications and a second processor supporting layer-2 communications; in response to said detecting, stop sending subsequent physical layer messages to the second processor; determine that the second processor has stopped sending response messages to the first processor; in response thereto re-start the messaging process by sending at least one new message to the second processor with updated System Frame Number, SFN, and Sub-Frame, SF, counter value; and receive at least one subsequent response messages from the second processor acknowledging receipt of at least one new message with an indication of the received and updated SFN and SF counter value of that message thereby confirming synchronization being restored.

In yet another form, an integrated circuit for determining a time-synchronization loss between a first processor supporting physical layer communications and a second processor supporting layer-2 communications is described. The integrated circuit comprises a first processor. The first processor is configured to: send a plurality of messages to the second processor, wherein each message contains a System Frame Number (SFN) and Sub-Frame (SF) counter value; receive a plurality of response messages from the second processor acknowledging receipt of each message with an indication of the received SFN and SF counter value of that message; compare the SFN and SF counter values of the received response messages with expected SFN and SF counter values to determine whether there is a match; and detect a loss of synchronization if there is not a match.

In another form, a communication unit for recovery from a time-synchronization loss is described. The communication unit comprises a transceiver, the first processor and the second processor. The first processor is coupled to the transceiver and configured to: detect that a loss of sync has occurred between the first processor supporting physical layer communications and a second processor supporting layer-2 communications; in response thereto, stop sending subsequent physical layer messages to the second processor; determine that the second processor has stopped sending response messages to the first processor; in response thereto re-start the messaging process by sending at least one new message to the second processor with updated System Frame Number, SFN, and Sub-Frame, SF, counter value; and receive at least one subsequent response message from the second processor acknowledging receipt of at least one new message with an indication of the received and updated SFN and SF counter value of that message thereby confirming synchronization being restored.

In yet another form, a communication unit for determining a time-synchronization loss between a first processor supporting physical layer communications and a second processor supporting layer-2 communications is described. The communication unit comprises a transceiver, the first processor and the second processor. The first processor is coupled to the transceiver and configured to: send a plurality of messages to the second processor, wherein each message contains a System Frame Number (SFN) and Sub-Frame (SF) counter value; receive a plurality of response messages from the second processor acknowledging receipt of each message with an indication of the received SFN and SF counter value of that message; compare the SFN and SF counter values of the received response messages with expected SFN and SF counter values to determine whether there is a match; and detect a loss of synchronization if there is not a match.

Although the described exemplary embodiments disclosed herein are directed to software-based methods and systems for determining, or recovering from, a time-synchronization loss in a communication unit between a first processor supporting physical layer communications and a second processor supporting layer-2 communications, the present invention is not necessarily limited to the example embodiments illustrate herein, and various embodiments of the circuitry and methods disclosed herein may be implemented with other devices and circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Also, the use of phrases such as 'or' within the description can be interpreted either exclusively or inclusively, depending upon which is broader in terms of the context described. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method of recovery from a time-synchronization loss in a communication unit between a first processor supporting physical layer communications and a second processor supporting layer-2 communications, the method comprising:
   sending physical layer messages from the first processor to the second processor: transmitting physical layer signals from the first processor over an air interface;
   detecting, by the first processor, that a loss of synchronization has occurred between the first and second processors;
   in response to said detecting, stopping sending subsequent physical layer messages from the first processor to the second processor;
   continuing to transmit physical layer signals from the first processor over the air interface after stopping sending subsequent physical layer messages to the second processor;
   in response to said stopping, re-starting a messaging process of sending physical layer messages between the first and second processors by the first processor by sending at least one new message to the second processor with updated System Frame Number (SFN) and Sub-Frame (SF) counter values:
   and receiving at the first processor at least one subsequent response message from the second processor acknowledging receipt of the at least one new message with an indication of the received and updated SFN and SF counter values of the at least one new message thereby confirming synchronization being restored.

2. The method of claim 1 wherein detecting the loss of synchronization at the first processor includes comparing received SFN and SF counter values in response messages from the second processor with expected values and detecting the loss of synchronization when there is no match.

3. The method of claim 2, wherein comparing received SFN and SF counter values in response messages from the second processor with expected values includes assuming by the first processor a linear progression of the SF counter values between received response messages.

4. The method of claim 1, further comprising in response to the loss of synchronization, consuming any pending physical layer messages by the second processor.

5. The method of claim 4, further comprising receiving at the first processor a number of response messages from the second processor after the loss of synchronization that indicate at least one pending message being consumed at the second processor.

6. The method of claim 4, further comprising stopping sending response messages from the second processor to the first processor in response to the second processor having consumed all of the pending physical layer messages.

7. The method of claim 6, wherein consuming any pending physical layer messages by the second processor includes determining by the second processor whether it has consumed all of the pending physical layer messages and stopping sending response messages to the first processor in response thereto.

8. The method of claim 1, wherein re-starting the messaging process by the first processor by sending at least one new message with updated SFN and SF counter values includes adding a number of skipped and missed SFs to the last SF counter value successfully received to generate the updated SFN and SF counter values.

9. The method of claim 1, wherein continuing to transmit physical layer signals from the first processor over an air interface includes continuing to transmit physical layer long term evolution, LTE, signals from the first processor over the air interface after stopping sending subsequent physical layer messages to the second processor.

10. The method of claim 9, wherein continuing to transmit physical layer LTE signals from the first processor over the air interface includes continuing to transmit physical layer broadcast channel signals from the first processor over the air interface thereby allowing at least one other communication unit to stay connected to the communication unit.

11. The method of claim 1, wherein stopping sending subsequent physical layer messages from the first processor to the second processor is exclusive of the first processor sending an out-of-synchronization error message to the second processor.

12. The method of claim 11, wherein in response to receiving an out-of-synchronization error message from the first processor, the second processor commences consuming any pending physical layer messages.

13. A method of recovery from a time-synchronization loss in a communication unit between a first processor supporting physical layer communications and a second processor supporting layer-2communications, the method comprising:
   detecting, by the first processor, that a loss of synchronization has occurred between the first and second processors;
   in response to said detecting, stopping sending subsequent physical layer messages from the first processor to the second processor;
   in response to the loss of synchronization, consuming any pending physical layer messages by the second processor;
   stopping sending response messages from the second processor to the first processor in response to the second processor having consumed all of the pending physical layer messages;
   in response to said stopping sending subsequent physical layer messages, re-starting a messaging process of sending physical layer messages between the first and second processors by the first processor by sending at least one new message to the second processor with updated System Frame Number (SFN) and Sub-Frame (SF) counter values; and
   receiving at the first processor at least one subsequent response message from the second processor acknowledging receipt of the at least one new message with an indication of the received and updated SFN and SF counter values of the at least one new message thereby confirming synchronization being restored.

14. A communication unit comprising:
   a first processor supporting a physical layer; and
   a second processor supporting a data link layer,
   the physical layer configured to:
   send physical layer messages to the second processor;
   transmit physical layer signals from the first processor over an air interface;
   detect that a loss of synchronization has occurred between the first and second processors;
   in response to said detect of loss of synchronization, stop sending subsequent physical layer messages to the second processor;

continue to transmit physical layer signals from the first processor over the air interface after stopping sending subsequent physical layer messages to the second processor;

in response to said stopping, re-start a messaging process of sending physical layer messages between the first and second processors by sending at least one new message to the second processor with updated System Frame Number (SFN) and Sub-Frame (SF) counter values; and receive at least one subsequent response message from the second processor acknowledging receipt of the at least one new message with an indication of the received and updated SFN and SF counter values of the at least one new message thereby confirming synchronization being restored.

15. The communication unit of claim 14 wherein the physical layer detects the loss of synchronization by comparing received SFN and SF counter values in response messages from the second processor with expected values and detects the loss of synchronization when there is no match.

16. The communication unit of claim 15, wherein comparing received SFN and SF counter values in response messages from the second processor with expected values includes assuming a linear progression of the SF counter values between received response messages.

17. The communication unit of claim 14, further comprising in response to the loss of synchronization, consuming any pending physical layer messages by the second processor.

18. The communication unit of claim 17, the physical layer receives receives a number of response messages from the second processor after the loss of synchronization that indicate at least one pending message being consumed at the second processor.

19. The communication unit of claim 17, further comprising stopping sending response messages from the second processor to the first processor in response to the second processor having consumed all of the pending physical layer messages.

* * * * *